(12) United States Patent
Ellingsrud et al.

(10) Patent No.: US 8,075,685 B2
(45) Date of Patent: Dec. 13, 2011

(54) CONTROLLED DETERIORATION OF NON-REINFORCED CONCRETE ANCHORS

(75) Inventors: Svein Ellingsrud, Trondheim (NO); Audun Sodal, Ranheim (NO); Hans Rechsteiner, Ranheim (NO); Harald Justnes, Trondheim (NO); Kare Ingvar Johansen, Ottestad (NO)

(73) Assignee: Electromagnetic Geoservices AS, Trondheim (NO)

( * ) Notice: Subject to any disclaimer, the term of this patent is extended or adjusted under 35 U.S.C. 154(b) by 1076 days.

(21) Appl. No.: 11/664,889

(22) PCT Filed: Oct. 7, 2005

(86) PCT No.: PCT/GB2005/003859
§ 371 (c)(1),
(2), (4) Date: Jul. 10, 2007

(87) PCT Pub. No.: WO2006/038018
PCT Pub. Date: Apr. 13, 2006

(65) Prior Publication Data
US 2009/0007834 A1    Jan. 8, 2009

(30) Foreign Application Priority Data
Oct. 8, 2004   (GB) ................................ 0422426.7

(51) Int. Cl.
*C04B 7/00* (2006.01)
*C04B 9/12* (2006.01)
*C04B 28/00* (2006.01)
*C04B 28/04* (2006.01)
*C04B 7/14* (2006.01)
*C04B 7/19* (2006.01)
*C04B 11/00* (2006.01)
*C04B 28/14* (2006.01)
*B63B 21/24* (2006.01)

(52) U.S. Cl. .................... 106/713; 106/715; 114/294
(58) Field of Classification Search .............. 106/713, 106/715; 114/294
See application file for complete search history.

(56) References Cited

U.S. PATENT DOCUMENTS

| | | | |
|---|---|---|---|
| 2,194,777 A | | 3/1940 | Waldo et al. |
| 3,856,540 A | * | 12/1974 | Mizunuma et al. ............ 106/705 |
| 3,905,322 A | * | 9/1975 | Peterman et al. ............. 114/218 |
| 4,098,333 A | * | 7/1978 | Wells et al. .................... 166/352 |

(Continued)

FOREIGN PATENT DOCUMENTS

DE          35 40 894 C1   4/1987

(Continued)

OTHER PUBLICATIONS

Sibbick et al., "The occurrence of thaumasite as a product of seawater attack," *Cement & Concrete Composites*, 25(8):1059-1066, Dec. 2003.

(Continued)

*Primary Examiner* — Shuangyi Abu Ali
(74) *Attorney, Agent, or Firm* — Patterson Thuente Christensen Pedersen, P.A.

(57) ABSTRACT

A concrete formulation, which undergoes controlled deterioration in water, that can be used for making anchors for releasably tethering submarine devices at the seabed. The anchor may have handles for a device release mechanism or a central hole for a central device release mechanism. The formulation includes additives, which cause the cement to transform into non-binding Thaumasite over a pre-set period of time, leaving only natural material on the seafloor.

17 Claims, 4 Drawing Sheets

U.S. PATENT DOCUMENTS

| | | | |
|---|---|---|---|
| 4,239,417 A | | 12/1980 | Harald et al. |
| 5,477,800 A | * | 12/1995 | Lawrence .................... 114/218 |
| 5,524,709 A | | 6/1996 | Withers et al. |
| 6,223,671 B1 | | 5/2001 | Head |

FOREIGN PATENT DOCUMENTS

| | | | |
|---|---|---|---|
| DE | 40 27 332 A1 | | 3/1992 |
| DE | 297 10 418 U1 | | 9/1997 |
| DE | 200 17 460 U1 | | 1/2001 |
| DE | 200 17 299 U1 | | 2/2002 |
| GB | 385664 | | 1/1933 |
| GB | 466985 | | 6/1937 |
| GB | 1 319 169 | | 6/1973 |
| GB | 1 377 700 | | 12/1974 |
| JP | 63129051 | | 6/1988 |
| JP | 1230455 | | 9/1989 |
| JP | 05-319370 | | 12/1993 |
| JP | 11209159 | | 3/1999 |
| JP | 11157889 | | 6/1999 |
| JP | 2000-211956 | * | 2/2000 |
| JP | 2000-211956 | * | 8/2000 |
| JP | 2000211956 A | | 1/2001 |
| WO | WO 00/63131 | | 10/2000 |

OTHER PUBLICATIONS

Australian Office Action, Feb. 24, 2011, 3 pages.

* cited by examiner

CONTROLLED DETERIORATION OF NON-REINFORCED CONCRETE ANCHORS

RELATED APPLICATIONS

This application claims priority to PCT Application No. PCT/GB2005/003859 filed Oct. 7, 2005, and Great Britain Application No. 0422426.7 filed Oct. 8 2004, the disclosures of which are hereby incorporated by reference in their entirety.

TECHNICAL FIELD

The invention relates to cement formulations. In particular, it relates to the controlled degradation of cement formulations.

BACKGROUND OF THE INVENTION

Concrete is widely used in contact with water in constructions such as piers, bridge pillars, oil platforms etc. Concrete may also be used to make anchors for releasably tethering a submarine device at the seabed. Submarine devices are used for many purposes, for example, Sea Bed Logging surveys. These surveys require measuring devices to be tethered on the seabed, remain static during the survey, and be released afterwards so that the expensive device can be reused.

The measuring device, to the top of which a floater element is attached, is strapped to a concrete anchor element. The anchor then helps to sink the device in a stable manner and to secure a stable position on the seabed. After the measurements are finished, the device is released and floats to the surface leaving the concrete anchor behind. The concrete anchor is left on the seafloor and apart from the fact that it is a foreign object on the seabed, it may subsequently present an obstacle for fisheries (e.g. trawling) or other industrial activity.

Therefore, it would be desirable to develop concrete that will disintegrate within a limited time after contact with water, and, for seawater applications, preferably only in seawater. In order to prevent the concrete anchors forming obstacles for trawling and other activities, the concrete should disintegrate shortly after the end of the useful life of the anchor. A secondary advantage of such an approach would be to ensure recovery of the expensive measuring devices after some time in cases where the release mechanism should fail.

The concrete composition should disintegrate into components that are not harmful to the environment and marine life.

The hydraulic binder of concrete based on Portland cement is amorphous calcium silicate hydrate (CSH-gel) where some 25% crystalline calcium hydroxide is embedded. Other less abundant minerals exist as well.

If sufficient calcium carbonate is added to such a concrete (e.g. as limestone filler), it is known that the concrete will be prone to degradation by sulphate attack at low temperatures (<15° C.), even if a so called sulphate resistant Portland cement is used. The binder will actually crumble and turn into a mush since CSH gel is transformed to Thaumasite (a calcium silicate carbonate sulphate hydrate; $Ca_3Si(OH)_6(CO_3)(SO_4) \cdot 12H_2O$) without binding properties. Three components are required to form Thaumasite:
  1. Calcium silicate (taken from the cement paste)
  2. Calcium carbonate (e.g. addition of limestone filler)
  3. Sulphate (usually intruded from the surroundings)

The formation of Thaumasite is discussed by Sibbick, T., Fenn, D. and Crammond, N. in "*The Occurrence of Thaumasite as a product of Seawater Attack*", Cement and Concrete Composites, Vol. 25, No. 8, December 2003, pp. 1059-1066. The bedding mortar of a recently constructed harbour wall step in South Wales had suffered severe cracking and spalling within 2 years. The reaction products formed included Thaumasite, Ettringite, Brucite and hydrated magnesium silicate. The study proved that concrete with limestone will eventually form Thaumasite in line with the chemical changes outlined above.

This reference discusses the undesired formation of Thaumasite and the problems caused thereby. However, the aim of the current invention is to provide a concrete formulation which may be used for seabed anchors, which will cause the anchor to disintegrate substantially shortly after the end of the useful life of the anchor. The useful life of the anchor after deployment in the sea is of the order of 1 month.

SUMMARY OF THE INVENTION

It is an object of the present invention to provide a cement formulation that will degrade in a controlled fashion, particularly in sea water.

The present applicants have discovered that the degradation of the binder in a cement can be accelerated somewhat (with respect to standard compositions) by using a cement composition with sufficient limestone filler and high water-to-cement ratio (w/c) to make the resulting concrete very open for diffusion of sulphates.

The present applicants have further discovered that concrete formulations which include calcium sulphate in the form of either anhydrite ($CaSO_4$), hemihydrate ($CaSO_4 \cdot \frac{1}{2}H_2O$) or gypsum ($CaSO_4 \cdot 2H_2O$) as an additive, as well as sufficient limestone filler, experience a greatly accelerated rate of degradation. Such concrete will be stable as long as it is stored dry and will only require fresh water to start the Thaumasite formation. Furthermore, the reaction takes place uniformly throughout the concrete cross-section and an even crumbling is likely to occur.

The present invention can be put into practice in various ways, some of which will now be described in the following set of example compositions, with reference to the accompanying drawings, in which.

The aspect of the invention extending to an anchor made substantially from a formulation as described may be put into practice in various ways, an example of which is described below with reference to the accompanying drawings, in which.

DETAILED DESCRIPTION

According to the invention, there is provided a Portland cement formulation comprising amorphous calcium silicate, the formulation additionally comprising calcium carbonate and a source of sulphate.

The calcium carbonate may represent 10 to 50 wt % of the formulation and may be in the form of limestone, chalk or calcite. The sulphate may represent 6 to 50 wt % of the formulation and may be in the form of a metal sulphate such as calcium sulphate. The composition of the cement is such that items formed from it will undergo disintegration as a result of a chemical reaction between the calcium silicate, the calcium carbonate and the source of sulphate, in the presence of water, to produce thaumasite. The particles in the cement which react to form Thaumasite will preferably be small (e.g. less than 1 mm in diameter) in order to allow the reaction to progress at an appropriate rate.

The preferred form of calcium sulphate is anhydrite ($CaSO_4$). Anhydrite is better for workability, in particularly if it is nearly "dead burnt" for delayed reactivity.

A preferred cement formulation is obtained when the calcium carbonate and source of sulphate are present in amounts which give rise to a molar ratio of $SO_4^{2-}/CO_3^{2-}$ of between 0.2 and 3.0. Particularly, the calcium carbonate and source of sulphate may be present in a stoichiometric ratio with respect to Thaumasite.

The cement formulation may additionally comprise calcium hydroxide. The calcium hydroxide may represent 2 to 40 wt % of the formulation. Preferably, the cement formulation contains no additives which would not decompose into components occurring naturally in the environment, and no organic admixtures.

The main components of seawater are in decreasing order; 18,980 ppm chloride ($Cl^-$), 10,561 ppm sodium ($Na^+$), 2,650 ppm sulphate ($SO_4^{2-}$), 1,272 ppm magnesium ($Mg^{2+}$), 400 ppm calcium ($Ca^{2+}$), 380 ppm potassium ($K^+$), 140 ppm carbonate ($CO_3^{2-}$), 65 ppm bromide ($Br^-$), 13 ppm strontium (Sr) and up to 7 ppm silica ($SiO_2$). Seawater is in principle saturated with respect to calcium carbonate and is essential for crustaceans, mussels etc in building protective shells. For this reason seawater has pH on the basic side (around 8).

Thaumasite, $Ca_3Si(OH)_6(CO_3)(SO_4).12H_2$, can be said to consist of 27.02% calcium oxide (CaO), 9.65% silica ($SiO_2$), 43.40% water ($H_2O$), 7.07% carbon dioxide ($CO_2$) and 12.86% sulphur trioxide ($SO_3$) although it is a calcium salt of silicate, carbonate and sulphate. Thaumasite occurs naturally, and transparent crystals are for instance found in the N'Chwaning Mine, Kalahari Manganese Field, Northern Cape Province, South Africa. Another site is the Bjelke Mine near Areskutan, Jamtland, Sweden.

Standard industrial concrete formulations include organic admixtures such as plasticizers, which improve the workability of the concrete and decrease the water demand. However, since the concrete of this invention is designed to disintegrate, the inclusion of these admixtures is undesirable due to environmental concerns.

According to a further aspect of the invention, there is provided a Portland cement formulation as described in any of the preceding aspects, which is mixed with an aggregate, optionally being a light weight aggregate, preferably with a particle size of less than 50 mm. The aggregate may optionally be any of the following: filler, sand, limestone with particle size greater than 1 mm or gravel.

The invention also extends to an anchor for releasably tethering a submarine device at the seabed, made substantially from a formulation which will allow the anchor to disintegrate as a result of a chemical reaction between the calcium silicate, the calcium carbonate and the source of sulphate, in the presence of water, to produce thaumasite. The anchor optionally includes a handle for the attachment of a release mechanism, which is preferably made of wood, leather or any other natural and environmentally non-polluting material suitable for the purpose. Alternatively, there may be a central hole for a central release mechanism.

The invention also extends to a method of tethering a submarine device at the seabed, which comprises: forming an anchor by mixing a cement or concrete formulation as described in any of the above aspects, respectively, with water, allowing the mixture to harden to form a finished anchor, attaching the submarine device to the anchor, and deploying the anchor and submarine device at a required location at the seabed. This method may be combined with the further steps of releasing the submarine device from the anchor and allowing the anchor to disintegrate as a result of a chemical reaction between the calcium silicate, the calcium carbonate and the source of sulphate, in the presence of water, to produce thaumasite.

The following materials were used in trial concrete mixing.
Cement: Norcem Rapid Portland Cement (Industry cement), laboratory cement
Limestone: 8 plastic bags of Verdalskalk Calcium carbonate, approximately 200 kg
Anhydrite: 1 bucket of Anhydrite, approximately 80 kg
Aggregate:
1 big bag of Norstone sand 0-8 mm, approximately 300 kg
2 big bags of Verdalskalk, limestone 8-16 mm crushed stone, approximately 300 kg
2 bags of FrØseth sand 0.4 mm, approximately 50 kg
Laboratory Concretes Proposed laboratory mixes to make concrete cubes and beams are shown in Table 1. The reference concrete is the one used by Spenncon Verdal AS today. Spenncon has previously produced concrete elements approximately 1,000×1,000×90 mm for EMGS. The composition of the other laboratory recipes is with increasing limestone filler content, ending up with a stoichiometric concrete composition that deteriorates the binder totally. The limestone content is increased in steps of 20% and the cement+limestone filler +anhydrite mass is kept constant to 410 kg/m³ concrete.

The concrete density is proposed equal for all the mixes. The water/cement (w/c) ratios are increasing from 0.45 to 0.81 and thereby the porosity increases as well.

TABLE 1

Nominal concrete composition, kg/m³

| | Mix No | | | | | | | | |
|---|---|---|---|---|---|---|---|---|---|
| | 1 | 2 | 3 | 4 | 5 | 6 | 7 | 8 | 9 |
| % Limestone | 0 | 20 | 20 | 40 | 40 | 60 | 60 | 80 | 80 |
| Rapid cement | 410 | 342 | 342 | 293 | 293 | 256 | 256 | 228 | 228 |
| Water, free | 185 | 185 | 185 | 185 | 185 | 185 | 185 | 185 | 185 |
| Water/cement-ratio | 0.45 | 0.54 | 0.54 | 0.63 | 0.63 | 0.72 | 0.72 | 0.81 | 0.81 |
| Limestone filler | 0 | 68 | 68 | 117 | 117 | 154 | 154 | 182 | 182 |
| Anhydrite | 0 | 0 | 86 | 0 | 147 | 0 | 192 | 0 | 228 |

TABLE 1-continued

| | Nominal concrete composition, kg/m³ | | | | | | | | |
|---|---|---|---|---|---|---|---|---|---|
| | Mix No | | | | | | | | |
| | 1 | 2 | 3 | 4 | 5 | 6 | 7 | 8 | 9 |
| Årdal 0-8 mm sand | 885 | 885 | 840 | 885 | 810 | 885 | 790 | 885 | 770 |
| FrØseth 0-3 mm sand | 40 | 40 | 40 | 40 | 38 | 40 | 38 | 40 | 37 |
| Verdalskalk 8-16 mm gravel | 880 | 880 | 840 | 880 | 810 | 880 | 785 | 880 | 770 |
| Density | 2400 | 2400 | 2401 | 2400 | 2400 | 2400 | 2400 | 2400 | 2400 |
| Cement + limestone | 410 | 410 | 410 | 410 | 410 | 410 | 410 | 410 | 410 |

From each mix 100 mm cubes and 100×100×400 mm prisms were made. The concrete was demoulded after 20 hours and placed in water at 20° C. until 7 days age.

Laboratory Procedures

Concrete for documentation of properties was mixed in a 60 liter forced action mixer. Each concrete was mixed in two batches to achieve a total volume of 120 liters.

The mixing was carried out according to the following procedure:
1. 1 min mixing of dry materials
2. addition of mixing water during 1 min mixing
3. addition of excess mixing water to get a slump of approximately 200 mm
4. 2 min rest
5. 2 min mixing Fresh concrete properties for each mix were determined according to EN 12350, part 2 (slump), part 6 (density) and part 7 (air content).

Compressive strength was determined on 100 mm cubes according to EN 12390 part 3.

Curing Regimes

After 7 days the specimens were stored at three temperature regimes:
1. In laboratory fresh water at 20° C.
2. In sea water 5°-9° C.
3. In concentrated seawater (5 times natural concentration) in laboratory at 5° C.

Testing Schedule

Three cubes were tested for compressive strength after demoulding at 24 hours. Three cubes were tested for compressive strength after 7 days in fresh water of 20° C. The other test specimens were placed in hardening regime 2 and 3 for later testing. The testing schedule from 1 month after mixing for each mix is shown in Table 2 (the number indicates number of cubes or prisms subjected for testing).

TABLE 2

| | Testing schedule for all mixes | | | | | | | | | | | |
|---|---|---|---|---|---|---|---|---|---|---|---|---|
| Testing after mixing | 1 month | | 2 months | | 3 months | | 4 months | | 5 months | | 1 year | |
| Bending strength 5° C. | 2 | 3 | 3 | 3 | 3 | | | | | | | |
| Compressive strength 5° C. | 3 | 3 | 3 | 3 | 3 | 3 | 3 | 3 | 3 | 3 | | |
| Hardening conditions | A | B | C | B | C | B | C | B | C | B | C | B | C |

A - Laboratory fresh water at 20° C.
B - Seawater 5-9° C.
C - Concentrated (5 times) seawater to increase the deterioration, 5° C.

Results

Fresh Concrete

The real compositions of the 9 mixes are shown in Table 3. The workability was measured by standard slump measure according to EN 12350-2. The density and air content was measured according to EN 12350-6 and EN 12350-7, respectively.

The density and air content was measured according to EN 12350-6 and EN 12350-7, respectively.

TABLE 3

| | | Real composition and fresh concrete results, (surface dry aggregates) | | | | | | | | |
|---|---|---|---|---|---|---|---|---|---|---|
| | | Concrete Mix No | | | | | | | | |
| | | 1 | 2 | 3 | 4 | 5 | 6 | 7 | 8 | 9 |
| Kg per m³ concrete | Industry cement | 400 | 334 | 277 | 286 | 212 | 250 | 170 | 223 | 143 |
| | Calcium Carbonate | 0 | 67 | 55 | 114 | 85 | 150 | 102 | 179 | 114 |
| | Anhydrite | 0 | 0 | 70 | 0 | 107 | 0 | 129 | 0 | 144 |

TABLE 3-continued

Real composition and fresh concrete results, (surface dry aggregates)

|  | Concrete Mix No | | | | | | | | |
|---|---|---|---|---|---|---|---|---|---|
|  | 1 | 2 | 3 | 4 | 5 | 6 | 7 | 8 | 9 |
| Årdal sand 0-8 mm | 856 | 861 | 866 | 865 | 870 | 863 | 863 | 867 | 862 |
| FrØseth sand 0-4 mm | 39 | 39 | 38 | 38 | 38 | 38 | 38 | 38 | 38 |
| Verdalskalk 8-16 mm | 856 | 861 | 861 | 860 | 865 | 858 | 858 | 862 | 857 |
| Free water | 219 | 211 | 208 | 209 | 201 | 208 | 208 | 204 | 207 |
| Water/binder-ratio | .55 | .631 | .750 | .731 | .950 | .835 | 1.22 | .915 | 1.45 |
| Slump, batch 1, mm | 195 | 180 | 200 | 190 | 190 | 190 | 210 | 200 | 210 |
| Slump, batch 2, mm | 205 | 190 | 200 | 200 | 200 | 190 | 210 | 200 | 210 |
| Air content batch 1, % | 1.2 | 1.3 | 1.2 | 1.2 | 1.4 | 1.3 | 1.0 | 1.3 | 0.9 |
| Air content batch 2, % | 1.2 | 1.2 | 1.3 | 1.3 | 1.3 | 1.2 | 0.9 | 1.3 | 0.9 |
| Density batch 1, kg/m3 | 2370 | 2370 | 2375 | 2375 | 2375 | 2365 | 2365 | 2370 | 2370 |
| Density batch 2, kg/m$^3$ | 2365 | 2375 | 2375 | 2370 | 2380 | 2370 | 2370 | 2375 | 2360 |

Hardened Concrete (in Fresh Water)

Eight 100 mm cubes were cast for determination of compressive strength according to EN 12390-3 at ages, 1, 7 and 28 days. The results are listed in Table 4.

TABLE 4

Testing results after hardening in air and fresh water

|  | Concrete Mix No | | | | | | | | |
|---|---|---|---|---|---|---|---|---|---|
|  | 1 | 2 | 3 | 4 | 5 | 6 | 7 | 8 | 9 |
| Compressive strength MPa after 1 day in air at 20° C. | 30.8 | 25.1 | 16.2 | 19.0 | 12.4 | 16.1 | 7.2 | 13.2 | 5.2 |
| Compressive strength MPa after 7 days in water, 20° C. | 42.0 | 37.1 | 27.3 | 33.1 | 22.6 | 27.9 | 15.9 | 23.6 | 13.1 |
| Compressive strength MPa after 28 days in water, 20° C. | 48.1 | 44.4 | 33.7 | 38.7 | 27.3 | 33.1 | 20.2 | 27.8 | 16.1 |
| Compressive strength MPa after 28 days in water, 5° C. | 46.5 | 43.2 | 31.5 | 36.9 | 26.6 | 31.6 | 18.9 | 26.7 | 15.1 |
| Flexural strength, MPa after 28 days in water, 5° C. | 5.9 | 5.2 | 3.5 | 5.2 | 3.4 | 4.0 | 2.7 | 4.0 | 2.5 |

Comments: Grey shades mark results for concrete with anhydrite

Hardened Concrete in Sea Water

The compressive and flexural strength of concrete cured in both fresh and sea water are given in Table 5. Grey shades mark results for concrete with anhydride. "-" indicates disintegrated concrete.

TABLE 5

Testing results after hardening in air, fresh water and sea water

|  | Concrete Mix No | | | | | | | | |
|---|---|---|---|---|---|---|---|---|---|
|  | 1 | 2 | 3 | 4 | 5 | 6 | 7 | 8 | 9 |
| Compressive strength MPa after 1 day in air at 20° C. | 30.8 | 25.1 | 16.2 | 19.0 | 12.4 | 16.1 | 7.2 | 13.2 | 5.2 |
| Compressive strength MPa after 7 days in fresh water, 20° C. | 42.0 | 37.1 | 27.3 | 33.1 | 22.6 | 27.9 | 15.9 | 23.6 | 13.1 |
| Compressive strength MPa after 28 days in freshwater, 5° C. | 46.5 | 43.2 | 31.5 | 36.9 | 26.6 | 31.6 | 18.9 | 26.7 | 15.1 |
| Compressive strength MPa 2 months in seawater, 5° C. | 45.7 | 43.7 | 30.5 | 37.4 | 22.9 | 31.8 | 9.9 | 27.1 | 6.4 |

TABLE 5-continued

Testing results after hardening in air, fresh water and sea water

| | Concrete Mix No | | | | | | | | |
|---|---|---|---|---|---|---|---|---|---|
| | 1 | 2 | 3 | 4 | 5 | 6 | 7 | 8 | 9 |
| Compressive strength MPa 3 months in sea water, 5° C. | 48.4 | 45.2 | 24.3 | 37.0 | 12.8 | 31.8 | 1.1 | 27.8 | — |
| Compressive strength MPa 4 months in sea water, 5° C. | 49.9 | 45.3 | 12.1 | 37.8 | 6.4 | 34.0 | — | 28.1 | — |
| Compressive strength MPa 5 months in sea water, 5° C. | 49.5 | | | | | | | | |
| Compressive strength MPa 12 months in sea water 5° C. | | | | | | | — | | — |
| Flexural strength MPa 28 days in freshwater, 5° C. | 5.9 | 5.2 | 3.5 | 5.2 | 3.4 | 4.0 | 2.7 | 4.0 | 2.5 |
| Flexural strength MPa 28 days in seawater, 5° C. | 6.5 | 5.6 | 3.6 | 5.1 | 3.5 | 4.6 | 2.7 | 3.9 | 2.3 |
| Flexural strength MPa 2 months in seawater, 5° C. | 6.3 | 5.8 | 3.7 | 5.5 | 3.1 | 5.0 | 1.8 | 4.2 | 1.2 |

Hardened Concrete in Concentrated Sea Water (Salt Water)

Compressive strength of concrete stored in concentrated (5×) sea water is given in Table 6.

TABLE 6

Testing results after hardening in air, fresh water and salt water

| | Concrete Mix No | | | | | | | | |
|---|---|---|---|---|---|---|---|---|---|
| | 1 | 2 | 3 | 4 | 5 | 6 | 7 | 8 | 9 |
| Compressive strength MPa after 1 day in air at 20° C. | 30.8 | 25.1 | 16.2 | 19.0 | 12.4 | 16.1 | 7.2 | 13.2 | 5.2 |
| Compressive strength MPa after 7 days in fresh water, 20° C. | 42.0 | 37.1 | 27.3 | 33.1 | 22.6 | 27.9 | 15.9 | 23.6 | 13.1 |
| Compressive strength MPa after 28 days in freshwater, 5° C. | 46.5 | 43.2 | 31.5 | 36.9 | 26.6 | 31.6 | 18.9 | 26.7 | 15.1 |
| Compressive strength MPa 28 days in salt water, 5° C. | 44.7 | 41.7 | 29.2 | 33.9 | 23.6 | 30.1 | 15.5 | 25.1 | 13.2 |
| Compressive strength MPa 2 months in salt water, 5° C. | 47.2 | 42.5 | 20.7 | 35.5 | 21.8 | 30.1 | 12.7 | 25.5 | 9.3 |
| Compressive strength MPa 3 months in salt water, 5° C. | 45.9 | 42.5 | 17.6 | 34.9 | 10.8 | 28.1 | 4.1 | 26.4 | 2.0 |
| Compressive strength MPa 4 months in salt water, 5° C. | 44.3 | 41.4 | 14.4 | 34.8 | 7.4 | 26.0 | 13/2 | 25.8 | 16/2 |
| Compressive strength MPa 12 months in salt water, 5° C. | | | | | | | | | |
| Flexural strength MPa 28 days in freshwater, 5° C. | 5.9 | 5.2 | 3.5 | 5.2 | 3.4 | 4.0 | 2.7 | 4.0 | 2.5 |
| Flexural strength MPa 28 days in c. salt water, 5° C. | 6.5 | 6.0 | 3.4 | 5.1 | 3.2 | 4.7 | 2.7 | 4.0 | 2.3 |
| Flexural strength MPa 2 months in salt water, 5° C. | 5.8 | 6.2 | 3.6 | 5.3 | 3.0 | 5.0 | 2.1 | 4.7 | 1.5 |

Comments:
Grey shades mark results for concrete with anhydrite

Discussion

Concrete Cured in Fresh Water

Figure 1:
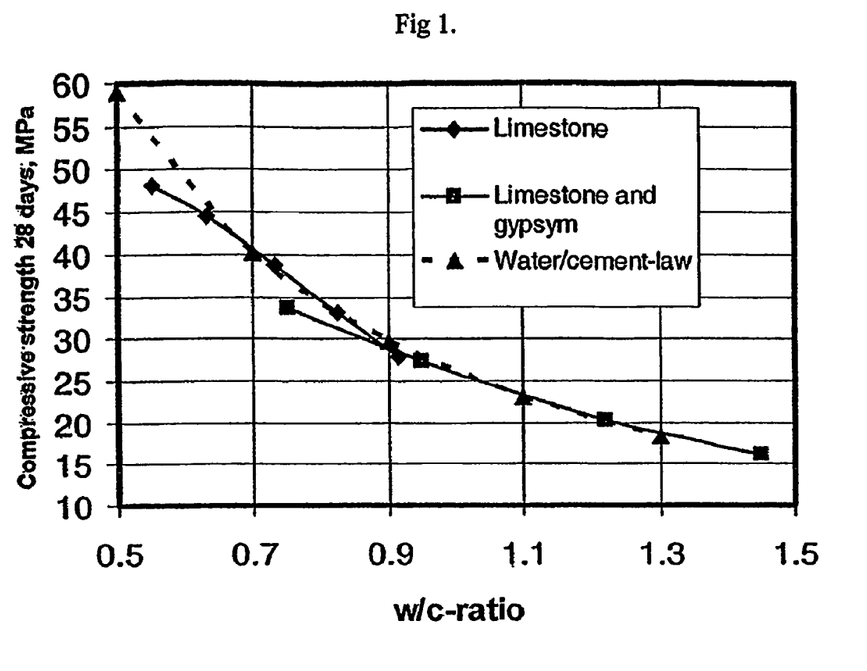
FIG. 1 is a plot of compressive strength at age 28 days versus water-to-cement ratio for concrete.

The development of compressive strength after 28 days curing versus water/cement ratio is shown in FIG. 1 and compared with results from Norcem. The concrete with limestone filler as well as the concrete with limestone filler and gypsum are close to the reference mixes.

Concrete Cured in Sea Water

Figure 2:
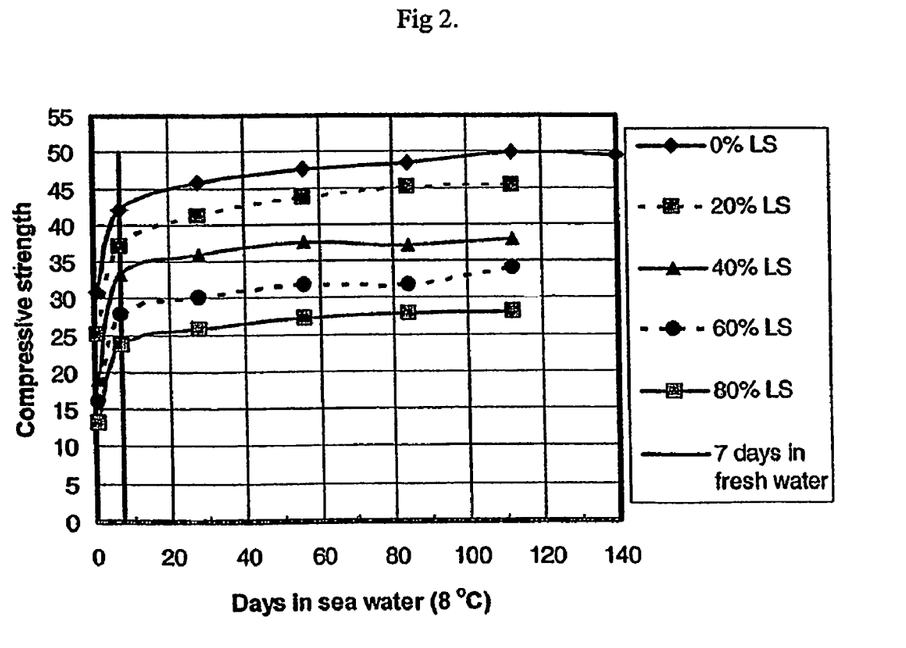
FIG. 2 is a plot of compressive strength evolution for concrete as a function of time and limestone (LS) addition.
Figure 3:
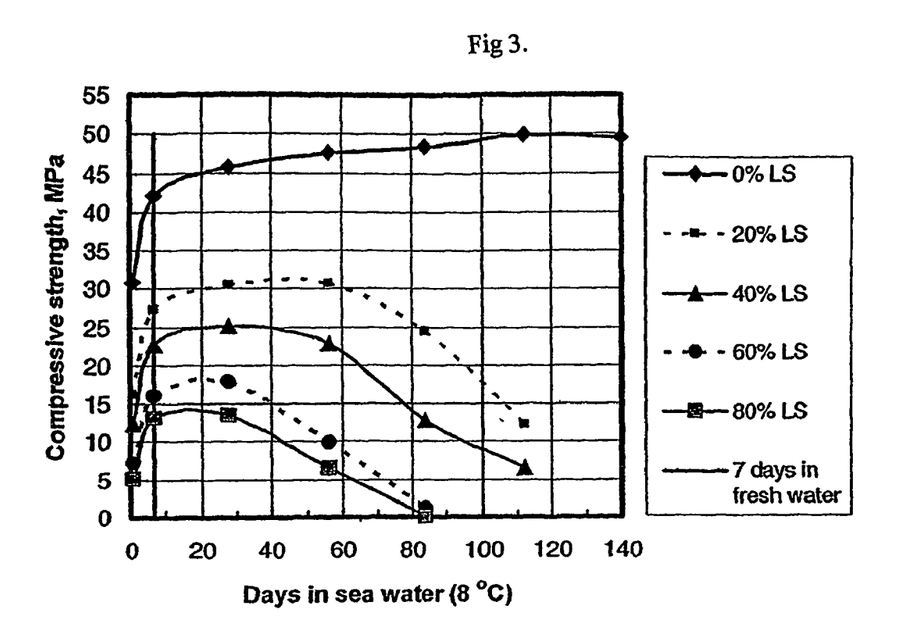
FIG. 3 is a plot of compressive strength evolution for concrete as a function of time and addition of limestone (LS)/anhydrite (ratio stoichiometric with respect to Thaumasite)
Figure 4:
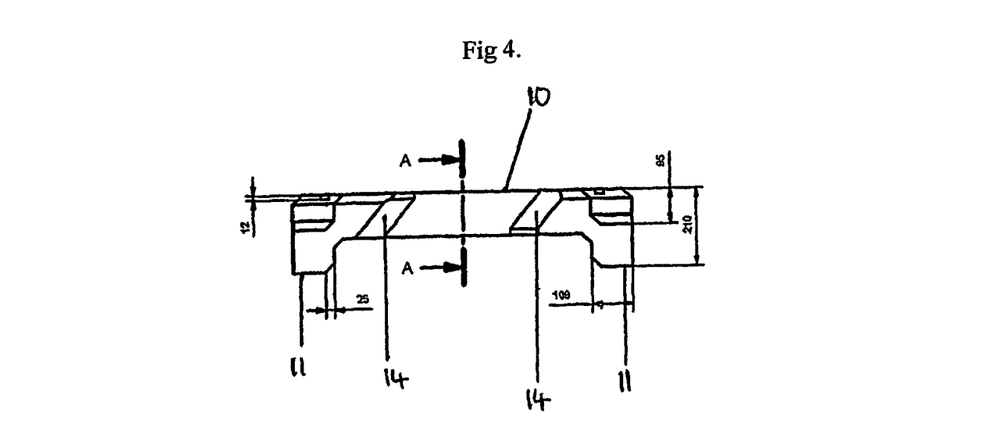
FIG. 4 is a side view of the anchor.
Figure 5:
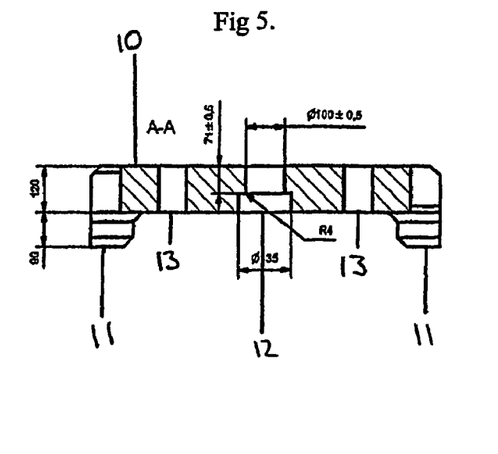
FIG. 5 is a section on A-A of FIG. 4.
Figure 6:
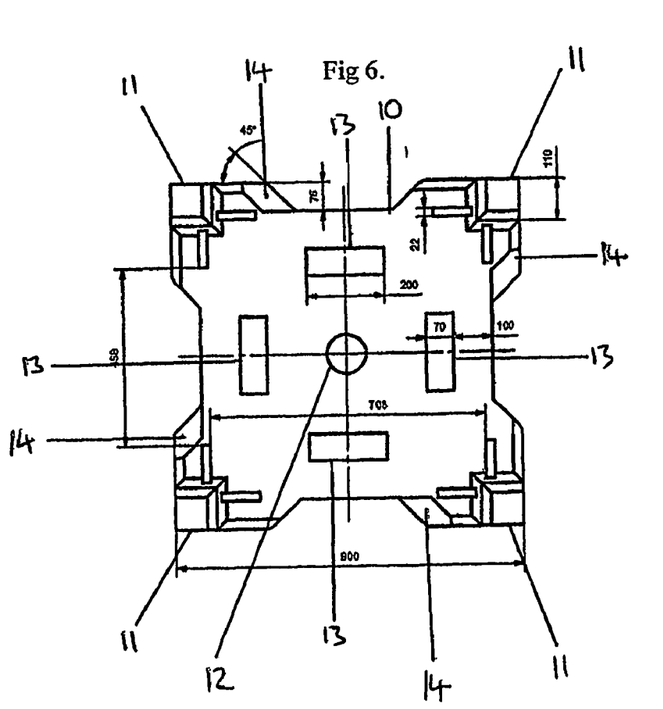
FIG. 6 is a plan view of the anchor.
Figure 7:
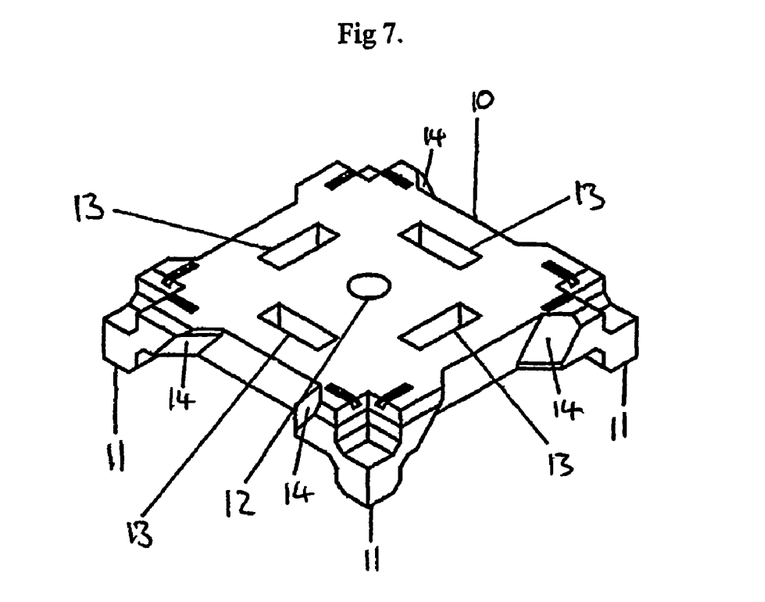
FIG. 7 is a view of the top surface of the anchor.
Figure 8:
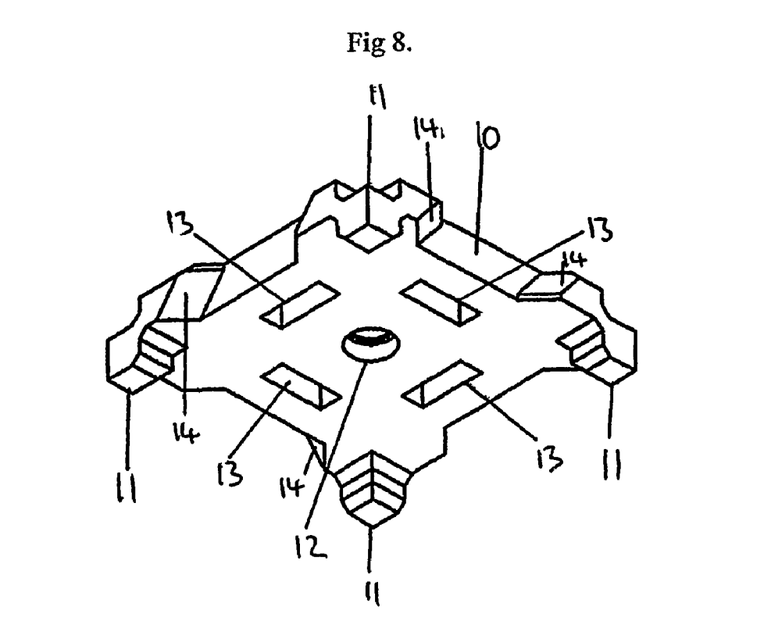
FIG. 8 is a view of the underside of the anchor.

All the concrete cubes (and prisms) were stored their moulds in laboratory conditions the first day and thereafter hardened in fresh water up to seven days. Then the prisms were placed in seawater (5° C. to 9° C.) and tested 1, 2, 3, 4, 5 and 12 months after casting. FIG. 2 shows the results with limestone filler only while FIG. 3 depicts the result with limestone filler and anhydrite in stoichiometric ratio with respect to Thaumasite formation.

Addition of limestone as the only additive has not yet (within the test period) given any significant deterioration, even for the most permeable and porous concrete.

The addition of both limestone filler and anhydrite to the concrete has caused increasing disintegration with increasing amount of additives. Concrete specimens with 60 and 80% limestone filler of cement weight were totally destroyed after 3 months.

TABLE 7

Strength development after hardening in freshwater and sea water
Concrete Mix No

| | 1 | 2 | 3 | 4 | 5 | 6 | 7 | 8 | 9 |
|---|---|---|---|---|---|---|---|---|---|
| Compressive strength MPa 7 days in fresh water, 20° C. | 42.0 | 37.1 | 27.3 | 33.1 | 22.6 | 27.9 | 15.9 | 23.6 | 13.1 |
| Compressive strength MPa 28 days in freshwater, 5° C. | 46.5 | 43.2 | 31.5 | 36.9 | 26.6 | 31.6 | 18.9 | 26.7 | 15.1 |
| Compressive strength MPa 28 days in salt water, 5° C. | 45.7 | 41.1 | 30.5 | 35.8 | 25.1 | 30.1 | 17.8 | 25.8 | 13.6 |
| Strength sea water 28 days/Strength fresh water 28 days | 0.98 | 0.95 | 0.97 | 0.97 | 0.94 | 0.95 | 0.94 | 0.97 | 0.90 |
| Flexural strength MPa 28 days in freshwater, 5° C. | 5.9 | 5.2 | 3.5 | 5.2 | 3.4 | 4.0 | 2.7 | 4.0 | 2.5 |
| Flexural strength MPa 28 days in sea water, 5° C. | 6.5 | 5.6 | 3.6 | 5.1 | 3.5 | 4.6 | 2.7 | 3.9 | 2.3 |
| Strength sea water 28 days/Strength fresh water 28 days | 1.10 | 1.08 | 1.03 | 0.98 | 1.03 | 1.15 | 1.00 | 0.98 | 0.92 |

Comments: Grey shades mark results for concrete with anhydrite

Compressive strength deterioration is less than 10% for all mixes during the three first weeks of exposure to sea water, which make them suitable as anchors for the seabed logging period.

The flexural strength was higher after three weeks exposure in sea water, except for the cement with the highest amount of limestone filler and anhydrite.

Concrete Cured in Concentrated Sea Water

There was only a small difference in deterioration between sea water and concentrated (5×) sea water for mixes with anhydrite. Since the specimen without anhydrite in natural seawater did not deteriorate, it is difficult to say whether the concentrated seawater increases the deterioration rate or not, but the compressive strength was somewhat lower after storage in concentrated sea water as seen by comparing results in Table 5 and 6.

Including limestone filler (i.e. calcium carbonate) in the recipe did not deteriorate the hardened concrete within 6 months after submersion in seawater.

To speed up the deterioration, tests were also performed by adding calcium carbonate and anhydrite in a stoichiometric ratio with respect to Thaumasite that deteriorates the binder totally. These specimens disintegrated in contrast to the specimen without anhydrite.

Increasing the amount of additives decreased the 7 and 28 days compressive strength for concrete hardened in fresh water.

Preferred Physical Form

Referring to FIGS. 4 to 8 of the drawings, the anchor comprises a body 10 with legs 11. The presence of two inclined surfaces 14 located on each side of the anchor results in the rotation of the anchor during sinking. Further, there is a hole 12 suitable for attaching a central release mechanism (not shown). Slots 13 are introduced in the body of the anchor, to stabilise the anchor during sinking.

Specific Preferred Embodiment

A recommended concrete composition with 40% limestone filler and a stoichiometric ratio of anhydrite with respect to Thaumasite was found to disintegrate in seawater after 4 months. The composition of the recommended concrete is:

| Ingredients in kg/m$^3$ | Producer | Recipe 1 | Recipe 2 |
|---|---|---|---|
| Rapid Portland Cement | Norcem | 210 | 210 |
| Free water | | 195 | 195 |
| Limestone filler | Verdal Kalkverk | 85 | 85 |
| Anhydrite | Outocompu, Odda | 110 | 110 |
| Sand 0-8 mm | Norstone, Ardal | 880 | 920 |
| Sand 0-4 mm | Froseth, local deposite | 40 | 0 |
| Crushed stone 8-16 mm | Verdal Kalkverk | 880 | 880 |

The concrete contains no ingredients harmful to the marine environment it is meant to serve in. All ingredients are found in natural gravel, limestone and/or seawater. The concrete does not contain any organic admixtures. The anchor is characterised in that its physical form causes it to rotate during sinking by means of the presence of inclined surfaces located along each side of the anchor.

The invention claimed is:

1. An anchor that undergoes controlled disintegration in seawater for releasably tethering a submarine device at a seabed, the anchor made substantially from a Portland cement formulation comprising amorphous calcium silicate, the formulation additionally comprising calcium carbonate and a source of sulphate, wherein upon being exposed to seawater for a pre-set period of time up to four months the anchor disintegrates from a binding formulation to a non-binding formulation such that the tethered submarine device is released from the anchor.

2. An anchor as claimed in claim 1, further including at least one handle for attaching a release mechanism.

3. An anchor as claimed in claim 2, in which the handle is made from a natural and environmentally non-polluting material.

4. An anchor as claimed in claim 3, in which the handle is made from wood, or leather.

5. An anchor as claimed in claim 1, further including a central hole for a central release mechanism.

6. The anchor as claimed in claim 1, wherein the calcium carbonate content is in the range 10 to 50 wt % of the formulation.

7. The anchor as claimed in claim 1, wherein the calcium carbonate is in the form of limestone, chalk or calcite.

8. The anchor as claimed in claim 1, wherein the sulphate content is in the range 6 to 50 wt % $SO_4^{2-}$ of the formulation.

9. The anchor as claimed in claim 1, wherein the sulphate is in the form of a metal sulphate.

10. The anchor as claimed in claim 9, wherein the metal sulphate is a calcium sulphate.

11. The anchor as claimed in claim 10, wherein the calcium sulphate is anhydrite.

12. The anchor as claimed in claim 1, wherein the calcium carbonate and source of sulphate are present in amounts which give rise to a molar ratio of $SO_4^{2-}/CO_3^{2-}$ of between 0.2 and 3.0.

13. The anchor as claimed in claim 1, wherein the calcium carbonate and source of sulphate are present in a stoichiometric ratio with respect to thaumasite.

14. The anchor as claimed in claim 1, wherein the formulation further includes calcium hydroxide.

15. The anchor as claimed in claim 14, wherein the calcium hydroxide content is in the range 2 to 40 wt % of the formulation.

16. The anchor as claimed in claim 1, wherein the formulation includes no additives which would not decompose into components occurring naturally in the environment.

17. The anchor as claimed in claim 1, wherein the formulation includes no organic admixtures.

* * * * *